United States Patent
Ziegler et al.

(10) Patent No.: US 10,600,266 B2
(45) Date of Patent: *Mar. 24, 2020

(54) ASSEMBLY MODULE FOR A MOTOR VEHICLE

(71) Applicant: Huf Hülsbeck & Fürst GmbH & Co. KG, Velbert (DE)

(72) Inventors: Alexander Ziegler, Wülfrath (DE); Helmut Schumacher, Coesfeld (DE); Norbert Heller, Grefrath (DE); Oliver Müller, Velbert (DE); Bernd Ette, Wolfsburg (DE); Nadine Sticherling, Essen (DE); Mirko Schindler, Velbert (DE); Jean Malabo Yomkil, Essen (DE); Stefan Mönig, Schwelm (DE); Iko Lindic, Essen (DE); Christof Hache, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/115,643

(22) PCT Filed: Jan. 7, 2015

(86) PCT No.: PCT/DE2015/100009
§ 371 (c)(1),
(2) Date: Jul. 29, 2016

(87) PCT Pub. No.: WO2015/113555
PCT Pub. Date: Aug. 6, 2015

(65) Prior Publication Data
US 2017/0169641 A1 Jun. 15, 2017

(30) Foreign Application Priority Data

Jan. 31, 2014 (DE) .......... 10 2014 101 195

(51) Int. Cl.
*G06K 9/20* (2006.01)
*G07C 9/00* (2020.01)
(Continued)

(52) U.S. Cl.
CPC .......... *G07C 9/00309* (2013.01); *B60R 25/10* (2013.01); *B60R 25/24* (2013.01);
(Continued)

(58) Field of Classification Search
CPC .......... G06K 9/00369; G06K 9/00791; G06K 9/209; G06T 7/20; G06T 2207/30196;
(Continued)

(56) References Cited

U.S. PATENT DOCUMENTS 6,668,104 B1 * 12/2003 Mueller-Fiedler .... B60S 1/0822
385/12
2006/0099559 A1 * 5/2006 Kohl .................... A61H 31/007
434/265
(Continued)

FOREIGN PATENT DOCUMENTS

CN 101519935 A 9/2009
CN 101784424 A 7/2010
(Continued)

OTHER PUBLICATIONS

First Office Action for Chinese application No. 201580006110.1 dated Feb. 5, 2018, and its English translation, 16 pages.
(Continued)

*Primary Examiner* — Benyam Haile
(74) *Attorney, Agent, or Firm* — Judy J. Ng; Bret E. Field; Bozicevic, Field & Francis LLP

(57) ABSTRACT

The invention relates to a mounted module (20) for a motor vehicle (1), comprising an optical sensor system (3) that is suitable for a) monitoring a detection area (21) located outside the vehicle (1), b) triggering a signal for starting an
(Continued)

Figure 1:
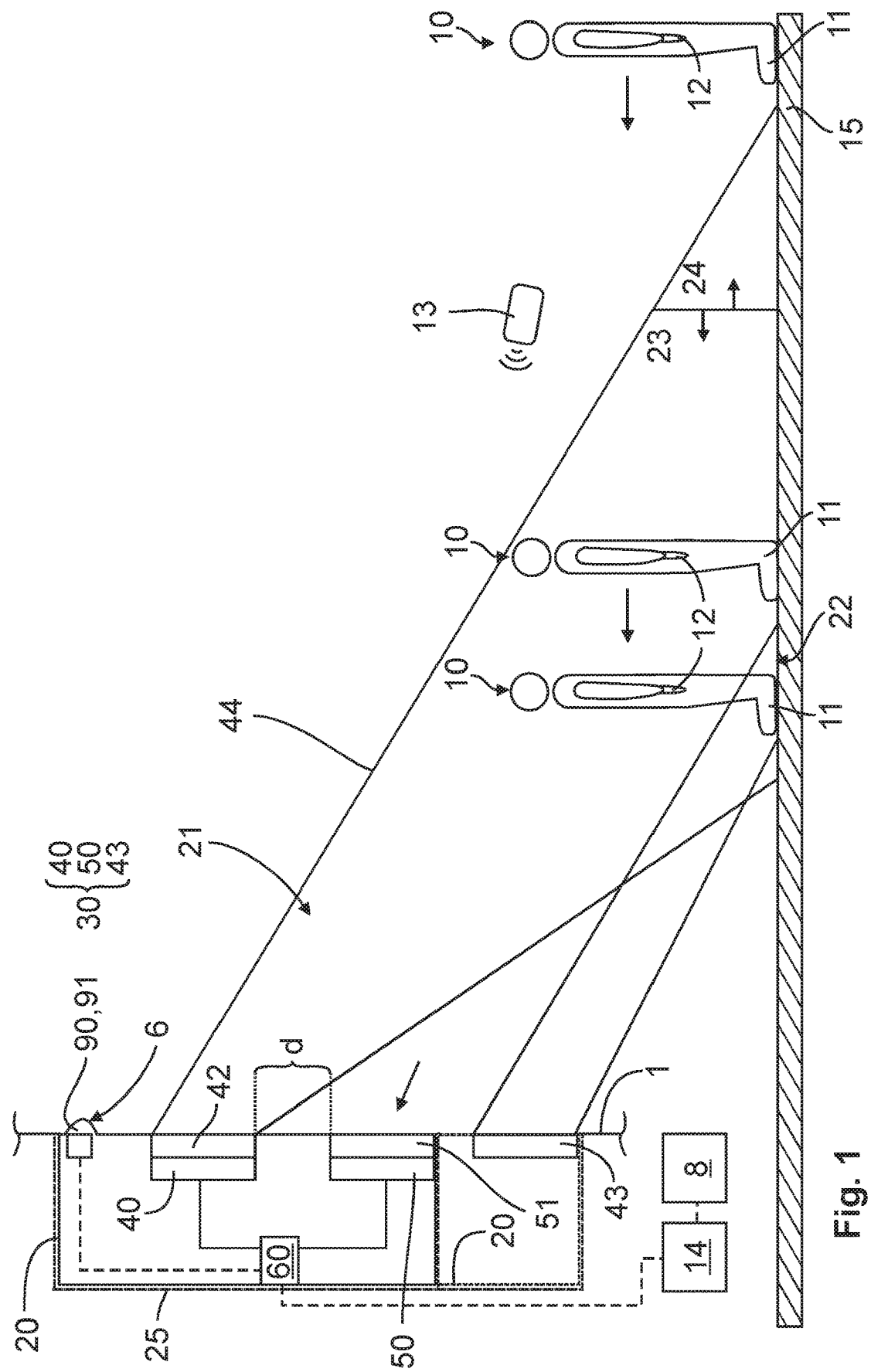

authentication process between an ID generator (13) and the motor vehicle (1) if a user (10) is detected in the detection area (21), c) monitoring an actuation area (22) which is located outside the vehicle (1) and differs from the detection area (21), d) providing an operating signal for the vehicle (1) if a user is detected in the actuation area (22).

23 Claims, 8 Drawing Sheets

(51) Int. Cl.
  *B60R 25/24* (2013.01)
  *B60R 25/10* (2013.01)
  *G06K 9/00* (2006.01)
  *G06T 7/20* (2017.01)
  *G01C 21/34* (2006.01)

(52) U.S. Cl.
  CPC ..... *G01C 21/3407* (2013.01); *G06K 9/00791* (2013.01); *G06K 9/209* (2013.01); *G06T 7/20* (2013.01); *G07C 2009/00261* (2013.01); *G07C 2209/64* (2013.01)

(58) Field of Classification Search
  CPC . G06T 2207/30252; G06T 2207/30248; B60R 2300/105; B60R 25/10; G01C 21/3407; E05B 81/77; E05B 81/78
  See application file for complete search history.

(56) References Cited

U.S. PATENT DOCUMENTS

| | | | | |
|---|---|---|---|---|
| 2007/0262574 | A1* | 11/2007 | Breed | B60R 1/00 280/735 |
| 2008/0074642 | A1* | 3/2008 | Hoersch | G01D 5/30 356/28 |
| 2011/0043325 | A1* | 2/2011 | Newman | B60R 25/2045 340/5.2 |
| 2011/0075158 | A1* | 3/2011 | Quek | G01D 5/30 356/615 |
| 2011/0276234 | A1* | 11/2011 | Van Gastel | E05B 81/78 701/49 |
| 2013/0270610 | A1* | 10/2013 | Suess | H01L 27/14643 257/258 |
| 2014/0009264 | A1* | 1/2014 | Song | G08C 19/00 340/5.64 |

FOREIGN PATENT DOCUMENTS

| | | | | |
|---|---|---|---|---|
| CN | 103527030 A | 1/2014 | | |
| DE | 102005032402 B3 * | 9/2006 | ........... | B60Q 1/0023 |
| DE | 102008021989 A1 | 12/2008 | | |
| DE | 102007050094 A1 | 4/2009 | | |
| DE | 102009023594 A1 | 12/2010 | | |
| DE | 102010056171 A1 | 6/2012 | | |
| DE | 102011115760 A1 | 4/2013 | | |
| JP | 2002-214361 A | 7/2002 | | |
| JP | 2010-107448 A | 5/2010 | | |
| JP | 2012-219469 A | 11/2012 | | |
| WO | WO-2007006514 A1 * | 1/2007 | ......... | G07C 9/00309 |
| WO | WO2013037806 A1 | 3/2013 | | |

OTHER PUBLICATIONS

Notice of Reasons for Rejections for Japanese Application No. 2016-567133 dated Oct. 16, 2018, with its English translation, 6 pages.

Notification of Third Office Action for Chinese Application No. 201580006110.1 dated Jun. 17, 2019, with its English translation, 10 pages.

* cited by examiner

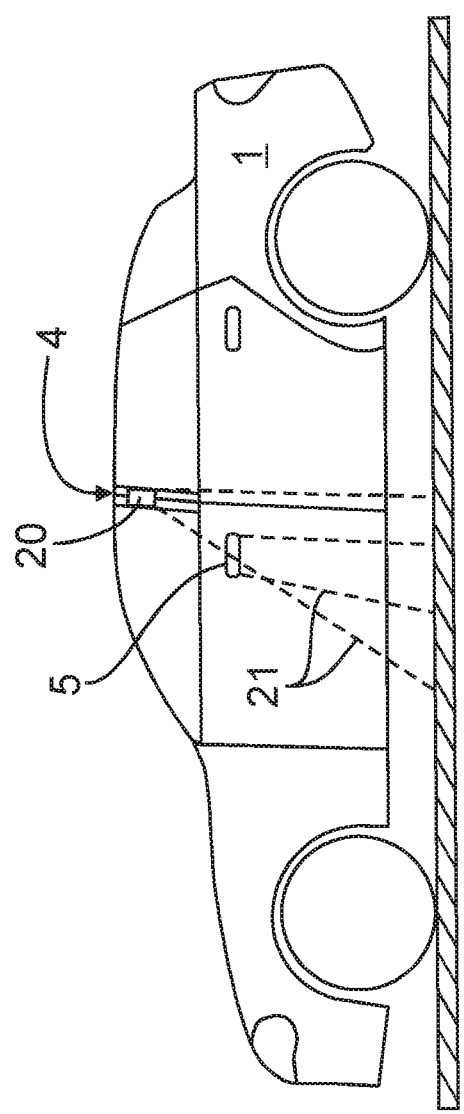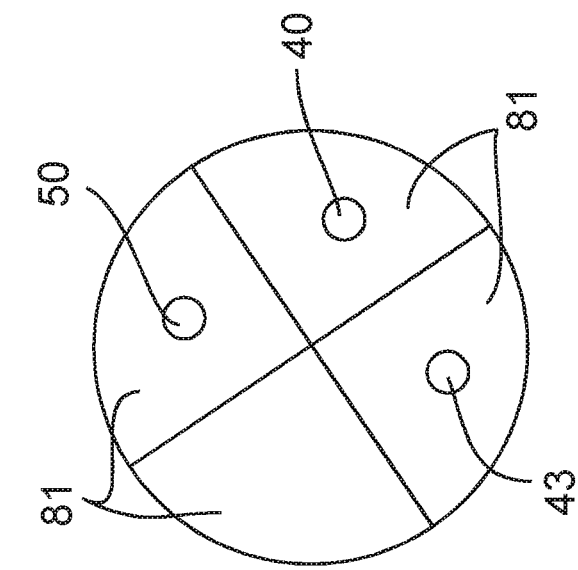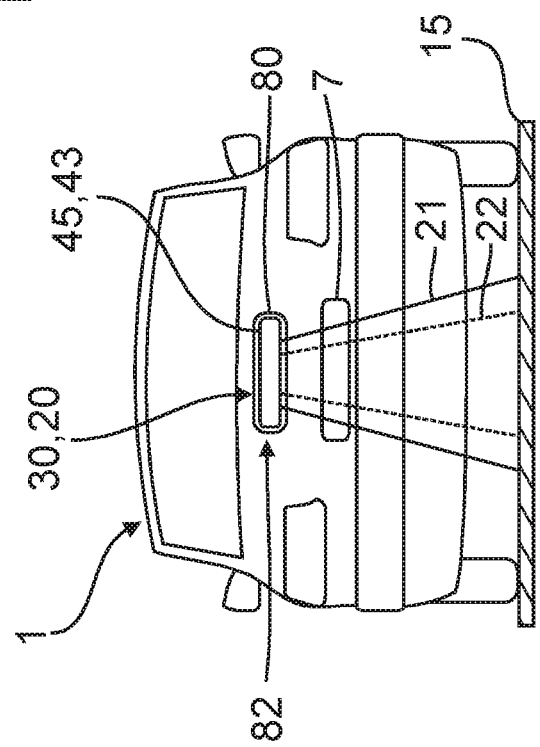
Fig. 7
Fig. 9
Fig. 8

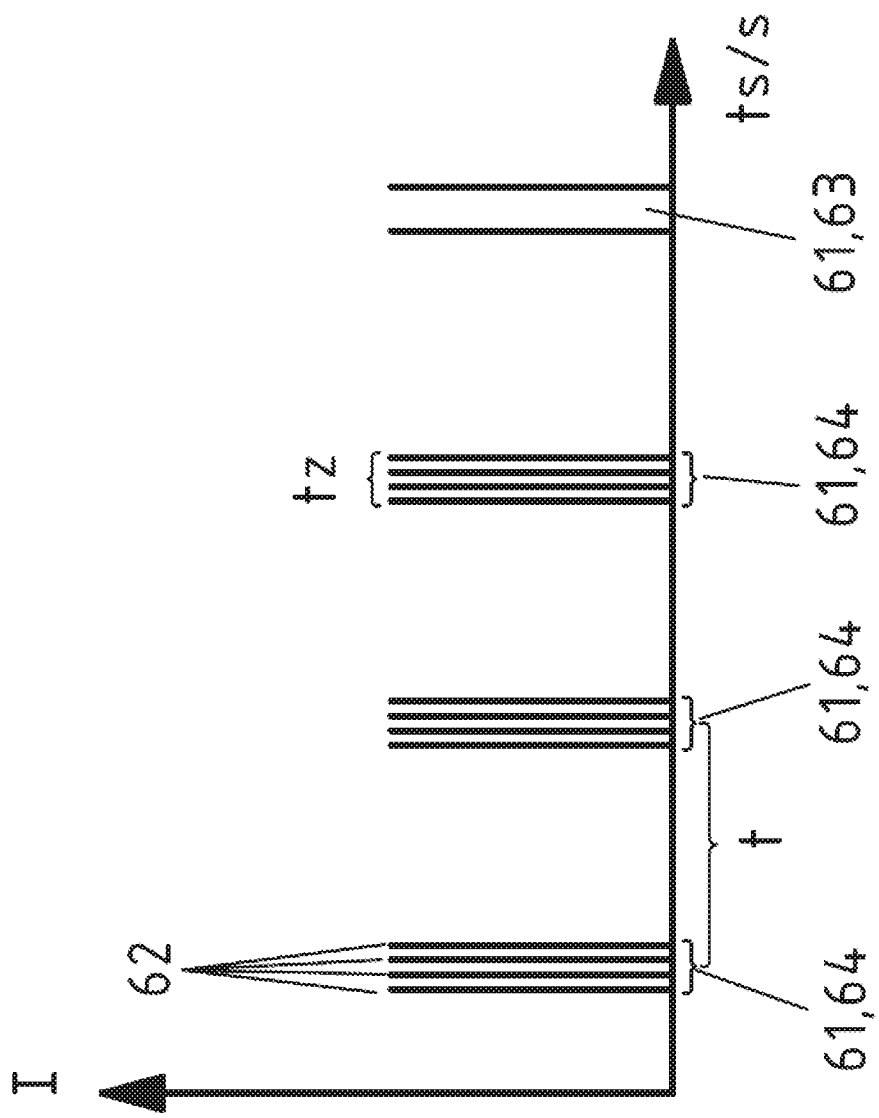

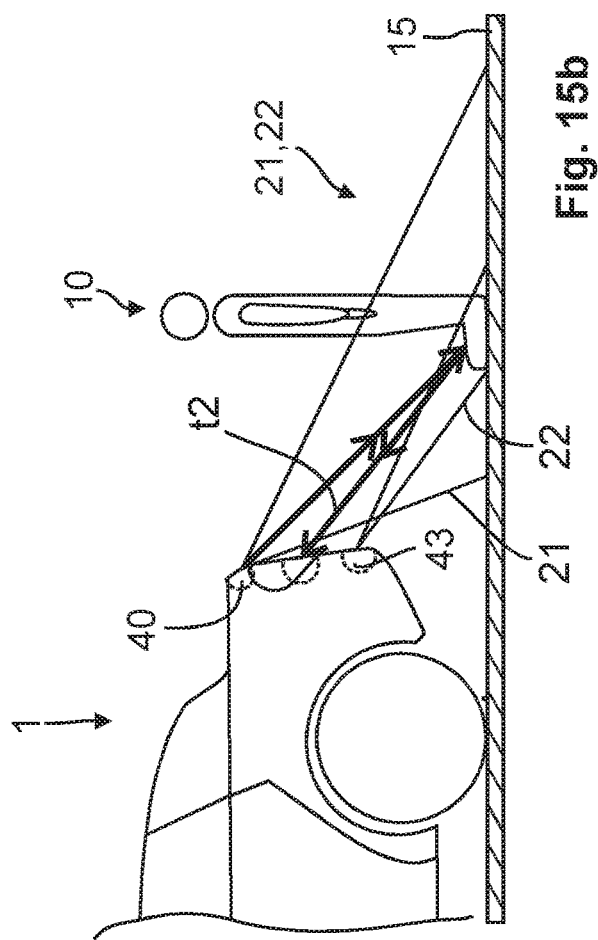
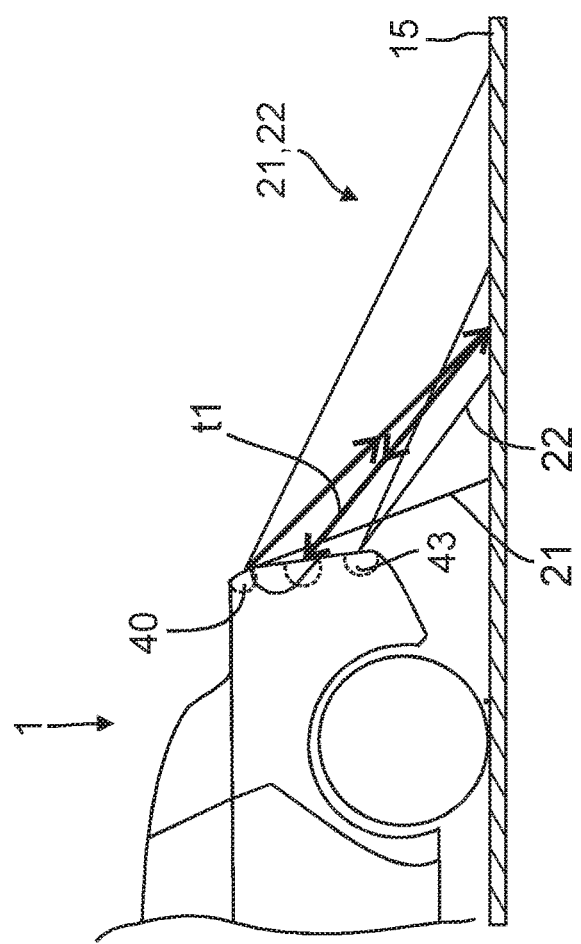

ASSEMBLY MODULE FOR A MOTOR VEHICLE

The invention relates to an assembly module for a motor vehicle, which is suitable for providing an operating signal for the motor vehicle in the event that a user is detected in the vicinity of the motor vehicle. The invention also relates to a method for triggering an operating signal for a motor vehicle such as described herein.

DE 10 2008 021 989 A1 discloses a light source, by means of which a control panel visible to the user is formed. The control panel is restricted to a small section of a ground area which corresponds approximately to the size of two shoe imprints. The control panel is formed, when the proximity of a person has been detected by an unspecified sensor. The user can consciously touch the control panel with a foot and thereby start an authentication check to provide access authorisation.

A disadvantage here is that the proximity of a person must first be detected with another sensor before the authentication check is started. To start the authentication check the user must also already be close to the motor vehicle and consciously enter a visible control panel. Thus the user must become active in order to start the authentication check. This is time-consuming for the user.

It is also known to start an authentication check by means of a capacitive sensor. To do this however, the user must execute an opening movement, e.g. grasp a door handle of a motor vehicle.

It is the object of the present invention therefore, to provide an assembly module for a motor vehicle and a method for triggering at least one signal for a motor vehicle, that eliminates at least one of the aforementioned disadvantages, and in particular enables an authentication check to be started unnoticed and/or in good time for the user and/or specifically for an approaching user.

To achieve this object, an assembly module is proposed. Advantageous extensions of the assembly module are specified in the dependent device claims of claim 1. In addition, the object is achieved by a method according to the independent claim 14. Advantageous extensions are specified in the dependent method claims.

According to the invention, the invention comprises a assembly module for a motor vehicle, with an optical sensor system, which is suitable for
a) monitoring a detection area which lies outside the vehicle,
b) triggering a signal for the start of an authentication check between an ID transmitter and the motor vehicle if a user is detected in the detection area,
c) monitoring an actuation area which is outside the vehicle and differs from the detection area,
d) providing an operating signal for the vehicle if a user is detected in the actuation area.

It is particularly advantageous that only one optical sensor system is integrated in the assembly module, which on the one hand monitors the detection area, and on the other, monitors the actuation area which differs from the detection area, and in particular can detect the extent to which a user is present in the detection area and/or in the actuation area. Since only one optical sensor system is used for monitoring both the areas which are outside the vehicle, the assembly module can be substantially reduced in terms of the number of components. Not until the user is in the detection area will the optical sensor system ensure that the authentication check between the ID transmitter and the vehicle starts, and in the event of a positive authentication, which means if the authorized user is in the detection area, then the actuation area is monitored by means of the optical sensor system. In order finally to trigger the operating signal for the vehicle, it is necessary for the user to enter the actuation area which is captured by the optical sensor system.

The optical sensor system advantageously comprises a control device which is responsible for monitoring the detection area and/or for detecting the user in the detection area and triggering the authentication check and/or for monitoring the actuation area and/or triggering of the operating signal for the motor vehicle. It is also conceivable that the assembly module comprises individual control unit modules, which are each responsible independently of each other for monitoring the detection area, for triggering the authentication check, for monitoring the actuating area and for providing the operating signal. These individual control unit modules are advantageously integrated in the optical sensor system. It can furthermore be essential to the invention that, by using the optical sensor system, the detection of a user can be specified over the pre-defined detection area, which can be demarcated as a section of space outside of the vehicle. The larger forms of the detection area are obtained from the design of the optical sensor system, wherein it is possible to specify the detection area in such a way that the user is detected in the detection area before initiating the triggering of an operating signal. The user can thus be detected earlier than is the case when a capacitive sensor is used, as described in the prior art. It is also possible to limit the detection area to a pre-defined section of space, which e.g. when using a high-frequency signal, as is also used in the prior art for identifying a user, would not be possible. Thus, only users who are near the optical sensor system can be detected. Consequently, in the detection area defined by the optical sensor system a user can be detected both at an early stage and in a targeted manner.

Advantageously, the optical sensor system can comprise a sensor and a light module with which light can be emitted, to cause a detection area to arise, wherein the sensor is designed to receive light from the detection area and/or the actuation area, wherein in particular the detection area is not visible to the user.

According to the invention, the assembly module can be designed with a light module which comprises a plurality of light sources. The light module advantageously emits infrared rays. The light is used to form the detection area. It can be provided that the detection area is invisible to the user. The light sources and/or the light module can be arranged around the optical sensor. Thus, for example, light sources can be arranged to the left and right of the optical sensor. Alternatively, the light sources can be arranged around the periphery of the optical sensor. The light can also be laser light.

In addition, the assembly module according to the invention can provide a display element to form the actuation area, wherein in particular the actuation area is visible to the user. Advantageously, the actuation area only emerges when a positive authentication check occurs. The user can carry out a corresponding action and/or movement within the actuation area, which allows the operating signal to be triggered. The sensor system in this case monitors the actuation area, and can decide according to defined criteria to what extent the user has performed the "correct" action within the actuation area, in order to trigger the operating signal. The display element can for example be designed to generate the visible actuation area on the ground area on which the vehicle also stands. The actuation area can also be at a corresponding height on the vehicle, i.e. spaced a distance above the ground area. For example, it is conceivable that the actuation area is approximately at the level of the optical sensor system.

According to the invention, the assembly module can be arranged in a holder which is designed for mounting the assembly module on the motor vehicle, in particular, the assembly module or the holder can be suitable for attaching to the rear of the vehicle or on one side of the vehicle, in particular, the assembly module can be integrated into a handle strip of the vehicle, wherein the holder can be arranged on an emblem of the vehicle. The handle strip can be arranged, for example, on the tailgate of the vehicle. Alternatively, the handle strip can be in the area of the door handle. Consequently, the actuation area can be in the area of the door handle. Alternatively, the actuation area can also simply be spaced just a pre-defined distance or distance range from the display element, which is known to the user. It is also conceivable that multiple actuation areas are provided, and that in each actuation area the user must show the user's intention, so that the user's intention is detected and the operating signal is provided. If the user is recognised in the actuation area, the user's intention is preferably detected by means of a predefined movement. The predefined movement can be the movement of a body part of the user in or on the actuation area. Additionally or alternatively, the predefined movement can be the movement of a body part of the user in the actuation area and/or out of the actuation area. The body part can be a foot or a hand of the user. It can also be the case that the predefined movement is more precisely defined, for example, the predefined movement can correspond to a predefined gesture.

The invention can also provide that the sensor system is designed in such a way that the detection area is divided up into in at least two zones, a near zone and a far zone, wherein the near zone has a smaller distance from the sensor system than the far zone, wherein a detection of the user takes place if the user is in the near zone. The sensor system is configured such that a constant and continuous monitoring of the detection area is carried out, wherein advantageously the user is already detected by the sensor system in the far zone but no authentication check is yet started, which would require additional energy of the motor vehicle. Only when the user is located in the near zone, a fact which is detected by the sensor system, is a signal triggered for the start of the authentication check. A boundary between the near zone and far zone can be provided, for example at a distance z from the optical sensor system. For example, the distance can be approximately z=0.6 m.

The assembly module can be designed in such a way that the light module and/or the sensor comprises a lens system, wherein in particular the lens system comprises a filter. It can be provided that the lens system, in particular the sensor, comprises an infrared filter which can be used to filter out extraneous light. The extraneous light can be, for example, sunlight or light from an artificial light source, e.g. a garage light. Also, the light module can comprise a polarization filter.

The optical sensor system can be implemented with the control unit for evaluating the optical sensor. The control unit can be designed to analyse images captured by the optical sensor. These can be images of the detection area and/or the actuation area.

It can be that the optical sensor system is designed to capture detection images and recognition images and, if appropriate, evaluate them. Detection images are created from the reflection of the emitted light of the light module. Recognition images are created from the extraneous light. To create the recognition images the light module does not emit any light. By comparing a detection image and a recognition image, the control unit can detect the extraneous light. The control unit can thus generate a modified detection image from which the extraneous light has been removed. The optical sensor system can be designed such that each recognition image is captured after a specified number of detection images. By means of the above measures, it is possible that the optical sensor system generates an image that is only generated by the light of the light module. The control unit can detect the user immediately.

To this end, the control unit analyses the images received by the optical sensor according to pre-defined criteria. The control unit can finally trigger the signal for starting the authentication check.

According to the invention, the optical sensor system can verify a defined requirement on the detection of the user in the far zone. For example, the size of the object in the far zone can be checked by the optical sensor system. In particular, this can be a different requirement than the one which is checked in the near zone. A requirement in the far zone is preferably selected which requires less electrical power than the requirement in the near zone. It can be that measurement of the distance of the object from the optical sensor is only carried out in the near zone. This subdivision also enables electrical power to be saved.

According to the invention, the optical sensor can be implemented as a LDPD Sensor (lateral drift-field photo detector). A CMOS sensor can also be deployed inside the optical sensor system. The optical sensors referred to capture images of the detection area or the actuation area. Each image can be composed in particular of a total number of pixels. The optical sensor can also have an image sensor, which comprises the total number of pixels. The LDPD sensor is particularly suited to being rapidly analysed and at the same time operating at low energy levels.

It is advantageous for the optical sensor system to be designed in such a way that the detection area is located, at least partially, above an area of ground on which the vehicle stands, in particular that the sensor system comprises a fixed lens system. It is conceivable that the optical sensor system is designed to continuously monitor the detection area while a motor vehicle is parked, until a successful authentication has occurred. In this case 'continuously' can mean that the optical sensor system is designed to record and/or evaluate an image after every specified period t. In particular, the value of the time interval can be 1 ms≤t≤3 s, preferably 0.05 s≤t≤0.05 s. The optical sensor system can continuously monitor the detection area from the time the vehicle is parked until a successful authentication. The continuous monitoring can be carried out, for example, from the moment at which there is no key in the ignition and/or the vehicle is locked and has been left by the user.

In order to continuously monitor the detection area, it is necessary to provide the optical sensor system and/or the authentication system with sufficient electrical power over a fairly long period of time. To this end, for example, a battery of the vehicle can provide the optical sensor system and/or the authentication system with electrical power. In order that the parked vehicle is still functional even after several weeks in the parked condition, it is necessary for the optical sensor system to only require a small amount of electrical power. The following measures are used for this purpose. For example, the optical sensor system can require a low level of electrical power when emitting the light and/or a small amount of power for evaluating the optical sensor. In addition, the optical sensor system can be designed such that the signal for the start of the authentication check is only rarely triggered. This is achieved, inter alia, by the fact that the detection area comprises a near zone and a far zone.

The advantage of a fixed lens system is that the lens system can monitor both the detection area and the actuation area. This means that only one lens system is used for the detection area and the actuation area.

It can also be advantageous that the light module is spaced a distance d from the optical sensor, which in particular has a value of approximately $1\ cm \leq d \leq 3\ cm$, preferably about 2 cm, and/or that the sensor system is designed in such a way that the detection area extends up to approximately 2 m. It has been shown to be advantageous for as many light beams of the light module as possible to also reach the reception area of the optical sensor, so that the light module only needs to emit light of a low intensity. This means that the light module must only consume a fairly small amount of electrical power.

Advantageously, the operating signal can be a signal for unlocking and/or locking and/or opening and/or closing a moving part of the motor vehicle, wherein the movable part is in particular a tailgate or a side door or a sliding door. The tailgate and/or the side door can be designed as a sliding door. Following the signal to open the movable part, the moving part can be unlocked. In particular due to the spring effect of a seal of the moving part, the moving part can then move a certain amount from a closed position and thus be partially opened. Additionally or alternatively, the operating signal can be a signal that activates a motorized aid for opening and/or closing a part of the vehicle. In this case the vehicle comprises a motor which fully opens and/or closes the moving part.

The signal for opening and/or closing the moving part can be in particular a signal to an electro-mechanical door lock.

Because the detection area is monitored and the authentication check is started if a user is detected in the detection area, in particular no active action by the user is necessary in order to start an authentication check. Rather, the launch of the authentication check is preferably initiated by the user unnoticed. Thus it can be provided that the optical sensor system initiates a passive keyless-entry verification. A passive keyless-entry verification is understood to mean a process in which an authentication check occurs of which the user is unaware. In a passive keyless-entry verification, the user does not need to initiate the authentication check by a conscious action.

Viewed from above, the detection area can preferably decrease in size towards the optical sensor system. This means that only users who probably approach the optical sensor system and/or the motor vehicle are selectively detected.

The mounting module can be designed, for example, to be installed such that the detection area is located at least partially above an area of ground on which the vehicle is parked. This means that the detection area is not restricted to only a small section of the area of ground in front of a motor vehicle. The same applies of course to the actuation area. It can be the case that the detection area and/or the actuation area begins near to the motor vehicle above the ground area and then extends at an angle until it reaches the ground area. In this case the detection area and/or the actuation area ends at the ground area. Alternatively, the detection area and/or the actuation area can end at least partially above the ground area. In one particular embodiment, the whole of the detection area and/or the actuation area is located above the ground area, in particular at a defined distance from the ground area.

Advantageously, the light module and the display element can be oriented in such a way that the actuation area is located nearer to the motor vehicle than the detection area, in particular that two actuation areas are provided. The actuation area can be inside the detection area, wherein the detection area is larger than the actuation area.

In order to trigger the operating signal for the vehicle, the optical sensor system is configured in such a way that after a defined period of time t, the actuation area or actuation areas must be "addressed" in accordance with a predefined action or gesture by the user. If this is not the case, then it is not possible to provide the operating signal for the vehicle.

The assembly module can be inserted, for example, in the boot of the vehicle, wherein the display element can be additionally used as lighting for a vehicle number plate. Additionally and/or alternatively, the assembly module can be designed to be arranged in an emblem of the motor vehicle. Alternatively and/or additionally the assembly module can also be suitable for being fixed to a side of a motor vehicle, e.g. in a B-pillar. This allows different detection areas in which a user typically approaches the vehicle to be monitored with the optical sensor system. Here also, the actuation area is provided by the optical sensor system after a positive authentication check.

The optical sensor system is advantageously configured in such a way that a change in distance is calculated in the near zone of the detection area and/or in the actuation area, namely when the user is present in the near zone or in the actuation area. This involves in particular measurements being made in at least two consecutive images, in particular recognition images. The distance measurement can be carried out by a time of flight measurement. It can be the case that the optical sensor has a resolution in which 2 pixels correspond to the area of the body part. A variation in the pixel size is also possible. The choice of the pixel size allows energy to be saved, which the optical sensor system needs for monitoring the external area of the motor vehicle.

Advantageously, the light module can emit the same light with respect to the wavelength and/or the duration of a light pulse for monitoring the detection area as for monitoring the actuation area. The design of the optical sensor system is preferably not changed. Thus the light module can have the same transmission area for monitoring the detection area as for monitoring the actuation area. Also, the optical sensor can have the same reception area for monitoring the detection area as for monitoring the actuation area. This therefore enables a cost-effective optical sensor system to be deployed for the assembly module.

Because the actuation area preferably has a smaller spatial extent than the detection area, it can be advantageous for the control unit of the optical sensor system to analyse only a small part of the image captured by the optical sensor when monitoring the actuation area. This part corresponds to the image of the actuation area. The number of pixels analysed can be less than the total number of pixels. This is a measure which also enables a low-energy operation of the sensor system.

The display element can be integrated jointly within the optical sensor system. It is also conceivable that the display element can be attached to the motor vehicle at a distance apart from the optical sensor system and constructionally separate from it.

It can be provided that the optical sensor system or the entire assembly module is designed for arrangement at the rear of the vehicle, for example behind the rear windscreen in a handle strip, in an emblem, in a rear light, behind a cat's eye, on a rear bumper and/or in a gap between two components. Alternatively and/or additionally, the assembly module can also be suitable for being fixed to a side of a vehicle, e.g. in a B-pillar. This allows different detection areas in which a user typically approaches the vehicle to be monitored with the optical sensor system. In particular, the optical sensor system or the entire assembly module can be concealed behind a layer which is opaque to the outside, but which is transparent to the light of the optical sensor system. Thus, the bumper, for example, to which the optical sensor system is fitted, can be painted.

The optical sensor system is preferably arranged on the motor vehicle in such a way that it is protected from dirt. For example, the optical sensor system can be arranged behind the rear windscreen, in the wiping area of the windscreen wiper or on the tailgate handle. Alternatively or additionally, the assembly module can have a washer nozzle with which the optical sensor system can be cleaned. This washer nozzle can e.g. always automatically clean the optical sensor system at the same time as the windscreen wiper of the front and/or rear windscreen is activated. A clean optical sensor system requires a lower light intensity to function, so that energy can also thereby be saved.

The intensity of the light emitted can depend on the brightness of the ambient light. The brightness of the ambient light can be determined by a brightness sensor.

If different user intentions can be detected during the monitoring of the actuation area, then different user intentions can be assigned to different gestures. Thus, for example, stepping with the foot into the actuation area can cause the tailgate to open, while a sideways movement of a hand near the optical sensor can cause a trailer coupling to be extended.

It is conceivable that the object must be removed from the actuation area within a specified removal period to ensure that the signal is provided. The removal of an object within a specified removal period can be part of the gesture. The beginning of the removal period can be made perceptible to the user. Thus, for example, a display element can adopt multiple illumination states. In one of the illumination states, such a display element can emit light of a constant brightness, in another illumination state the brightness can e.g. change periodically. Thus, for example, at the start of the actuation period the display element can emit light of a constant brightness. During the removal period the display element can e.g. flash. Only when the object, in particular a body part of the user, is removed from the actuation area within the removal period, is the signal provided.

It can be provided that the assembly module and/or motor vehicle has at least one means which facilitates making the user's intention known in the actuation area, so that the signal is triggered.

In this way, the assembly module can emit an alert signal that the actuation period is about to end. The alert signal can begin, e.g., as a result of a change in the illumination state of the display element. The alert signal can correspond to another illumination state of the display element. For example, at the end of the actuation period the display element can flash. The means corresponds to an appropriate procedural specification in the monitoring unit.

It can also be helpful for the user to make known the user's intention if the user is guided to the actuation area. This is in particular the case if due to carrying a large object the user cannot perceive the end surface of the actuation area on the ground area. To this end the installation module and/or the motor vehicle can have means, by which a perceptible, in particular visible, audible or tactile, signal can be generated for the user. For example, the assembly module can have illumination elements, e.g. LEDs. The illumination elements can be arranged in such a way that the illumination elements act as direction indicators. For example, the illumination elements can be oriented in such a way that they generate markings on the ground area which lead to the actuation area. Additionally or alternatively, the lighting elements can be arranged next to each other. The illumination elements can be switched on in a sequence that shows the user the direction in which the user must move to reach the actuation area.

Instead of the lighting elements, existing lighting elements arranged side by side in the motor vehicle can also be used for this purpose, e.g. the illumination elements of a headlight, a brake light, a turn indicator, or similar. It is also conceivable to give the user an acoustically audible indication as to the direction in which the user has to move. To do this, the assembly module can have a loudspeaker. It is also conceivable to communicate the change of direction to the ID transmitter, which shows the way to the user using different vibrations. If the user is informed of a change of direction, then the optical sensor system determines the position of the user and the direction in which he must move to reach the actuation area, and causes the perceptible means to send out the appropriate signal.

It can also be useful for the user that the position of the actuation area and/or the duration of the actuation period can be varied. This is particularly useful if a physically impaired user wishes to make his user intention known. This is also helpful if the actuation area is located in position which is inconvenient for the user. The inconvenient position can also be permanent. For example, the actuation area can end on a trailer coupling. Alternatively, the inconvenient position may only be inconvenient for triggering a one-off operating signal, e.g. because the actuation area ends at a puddle. To change the position of the actuation area and/or the duration of the actuation period, in particular a predefined user action can be provided. Thus, for example, the user can change the position of the actuation area and/or the duration of the actuating period by an entry in a user menu, e.g. of a vehicle computer or an ID transmitter. Alternatively, the predefined user action can be detected by the optical sensor system. In a further alternative the assembly module can be switched into a learning mode, in which the assembly module learns the modified position of the actuation area and/or the modified duration of the actuation period.

It can also be useful for the user that the actuation area is monitored again to determine a user intention to trigger an operating signal, after a first actuation period has terminated without identification of a user intention. This is particularly useful if the user was distracted and did not reach the actuation area in time, or performed the wrong gesture.

It can therefore be provided that the actuation area can be monitored multiple times, in particular twice or three times, consecutively. The repeated monitoring of the actuation area can be initiated automatically. Alternatively, a predefined user action can be provided in order to monitor the actuation area again for an additional actuation period. For this purpose, a capacitive sensor is addressed by the user, for example. Alternatively, it can be a predefined user action act that is detected by the optical sensor system.

The predefined user action, which is detected by the optical sensor system and which causes a change in the position of the actuation area and/or of the actuation period and/or a re-monitoring of the actuation area for detecting a user's intention, can involve, for example, the following user actions: a pre-defined gesture within the actuation and/or detection area, such as moving a body part of the user to and fro, non-withdrawal of the body part if a withdrawal was expected, a movement of the user into the detection and/or actuation area and/or out of the detection and/or actuation area. In particular, the body part can be a hand or foot. It can be further provided that the user leaves the detection area for a specified time and then goes back into the detection area.

If the actuation area is again monitored to determine a user's intention, then the display element also indicates this. If the position of the actuation area is changed, then the display element indicates this. For this purpose, the display element can comprise a plurality of lamps, e.g. LEDs. Each of one or more lamps makes one actuation area at least partially visible. The actuation area with the modified position is preferably within the detection area. Depending on which actuation area is being monitored, the corresponding pixels are analysed.

It can be the case that a position of the ID transmitter is checked during or after an authentication and before triggering the signal. For this purpose, the strength of a signal emitted by an ID transmitter can be used. For example, the Receive Signal Strength Indicator (RSSI) can be used for this purpose. By determining the strength of the emitted signal, it can be determined, for example, whether the user is in front of, next to or behind the motor vehicle. This can be used to ensure that only the authorized user alone has entered the detection area and made known his user intention in the actuation area. It is conceivable to query the RSSI in a cyclical manner.

By using light of different wavelengths, energy can also be saved. Thus, the monitoring of the detection area up until the unique detection of a given object in the detection area can be carried out with light of a longer wavelength than the subsequent checking of additional requirements that are applicable to the detection of a user. Initially, e.g. light with a wavelength of 905 nm can be used. If an object is detected in the detection area then, for example, light of a wavelength of 800 nm can be used. Alternatively, the wavelength can become shorter when the object changes from the far zone into the near zone.

In addition, the object is achieved by a method as described herein. The method for triggering an operating signal for a motor vehicle comprises an optical sensor system which performs the following steps:
a) monitoring a detection area which is outside the vehicle,
b) triggering a signal for the start of an authentication check between an ID transmitter and the vehicle if a user is detected in the detection area,
c) monitoring an actuation area which is outside the vehicle and differs from the detection area,
d) providing the operating signal for the vehicle if a user is detected in the actuation area.

The advantages of the method according to the invention substantially correspond to the advantages described with respect to the assembly module according to the invention. The method according to the invention is preferably a method that can be executed with the assembly module as previously described, in particular, the authentication can be a passive keyless entry verification. Hereafter, several points which are essential to the invention are presented, and for more detailed comments reference is made to the general description of the assembly module according to the invention, which also apply to the method according to the invention.

Advantageously, the detection area is monitored continuously. However, the optical sensor system requires little energy in order to reliably monitor the detection area. The detection area is advantageously divided up into at least two zones, a near zone and a far zone, wherein the near zone has a smaller distance from the sensor system than the far zone, wherein a detection of the user in accordance with step b) only takes place when the user is in the near zone. According to the invention, the sensor system can emit light in the range which is invisible to the user. It is conceivable that the sensor system emits pulsed light. The invention can also provide that the sensor system is switchable between a sleep mode and an operating mode, wherein the sensor system is in the sleep mode until the user enters the near zone. This allows energy to be saved during the operation of the method. Advantageously, the pulse frequency in the sleep mode is lower than in the operating mode. It can also be the case that multiple light pulses are emitted sequentially by the light module in order to be able to generate an image. The light pulses can be integrated or summed together in order to generate the image. It is also possible, in step a) during the monitoring of the detection area or in step d) during the monitoring of the actuation area, for the control unit to analyse only a part of the image captured by the optical sensor. Energy can be saved here also.

An access control system of a motor vehicle in accordance with step b) will preferably send a wake-up signal to the ID transmitter. An authentication code is then sent by the ID transmitter to an access control system of the motor vehicle. The access control system then compares the authentication code with a stored code. If appropriate, in the event of a match, an unlocking signal and/or a signal for monitoring the actuation area can in particular be triggered. Thus step c) or step d) can be carried out.

Advantageously, the emission of pulsed light by the sensor system allows a change in the distance of a user present in the detection area or in the actuation area to be reliably determined. Advantageously, the method comprises a display element which for step c) emits light in the visible range to create an actuation area for the user, and in particular that the actuation area is within the detection area. Normally the actuation area is designed to be smaller than the detection area in its spatial configuration. The actuation area is advantageously located a smaller distance from the motor vehicle, in particular from the sensor system, than the detection area.

In a measure which improves the invention, the sensor system can comprise a sensor which receives light from the detection area and/or actuation area, wherein the sensor system comprises a control unit which evaluates data from the sensor. The method according to the invention also includes a sensor system that emits a plurality of light beams, in particular light cones, which combined together can form the detection area and/or the actuation area. Therefore, the sensor system can comprise a plurality of light sources that emit pulsed light into the detection area.

The pulsed light is advantageously in the non-visible wavelength range, so that the user is detected unobtrusively in step b), which means the authentication check is also performed unobtrusively. The actuation area is advantageously inside the detection area, wherein the actuation area differs from the detection area in terms of its dimensions, in particular the actuation area is smaller than the detection area. If the user carries out a conscious action within the actuation area, the user is still in the detection area, wherein the light module in step c) continues to emit light in the non-visible range. This light is advantageously pulsed, so that in the actuation area a change in distance can also be determined, which arises due to a movement of the user in the actuation area. Only when a defined distance change has occurred does the control unit decide that the operating signal is provided for the vehicle.

A measure which improves the invention can provide that the sensor system carries out a distance change check to detect a user approaching the motor vehicle in the detection area and/or in the actuation area, wherein in particular, the sensor system only carries out a distance change check when the user is in the near zone. This allows energy to be saved during the continuous monitoring of the detection area. Furthermore, the method according to the invention can be designed in such a way that the sensor system receives and/or captures images of the detection area and/or the actuation area, wherein the images are pulsed images and unpulsed images, wherein the pulsed images arise due to the reflection of a pulsed light emitted from the sensor system and the unpulsed images arise due to the light of the detection area and/or actuation area, wherein the pulse frequency of the emitted light is lower in the sleep mode than in the operating mode.

Detection of the user in accordance with step b) or in accordance with d) occurs only if the user moves in the detection area or in the actuation area. For this purpose, for example, the pixels that form the object from two sequentially captured images, in particular recognition images, can be compared. In addition or as an alternative, for example, a distance between the object and the optical sensor in at least two sequentially recorded images, in particular recognition images, can be measured. If different distances are detected, then the object has moved within the detection area or in the actuation area. In order to determine a distance from the object to the optical sensor, a time of flight measurement can be carried out. In in this case, for example, one or more light pulses are emitted and the time the light pulse takes to the object and from there to the optical sensor, is measured. The time is then proportional to the distance to the object.

It is also conceivable according to the invention that in step b) a user is only detected in the detection area when the object approaches the optical sensor system and/or the motor vehicle in the detection area. This means that a movement of the object in the detection area is not itself sufficient to trigger the signal for starting the authentication check. Only if the distance from the object to the optical transmitter and/or to the motor vehicle is reducing is a signal for starting the authentication check triggered. To achieve this, the distance from the object to the optical sensor in at least two sequentially captured images, in particular recognition images, is measured. In order to measure the distance a time of flight measurement can be carried out. If the user is merely present in the detection area and is not approaching the optical sensor system, no authentication check is performed, which enables an energy-saving operating mode of the method according to the invention to be achieved. Only a significant approach of a user or of an object within the detection area triggers step b). In particular, when the object or the user enters the near zone, step b) is performed.

Advantageously the monitoring of the detection area is carried out in such a way that the pulsed images are compared with the unpulsed images, in particular that a distance change check is carried out in which the pulsed images are compared with the unpulsed images. In this arrangement, every image can be composed of a total number of pixels, wherein for monitoring the detection area and/or the actuation area only a number of pixels which is less than the total possible number of pixels is checked.

In addition, according to the invention the method can also be extended in such a way that by means of defined movements of the user's body part in the detection area and/or actuation area, further signals can be triggered which trigger other vehicle functions. The following actions on the motor vehicle are conceivable:
    opening and/or closing a window of the vehicle,
    opening and/or closing the bonnet of the vehicle,
    opening and/or closing the fuel tank cover of the vehicle,
    switching on and/or switching off a parking heater or a windscreen heater of the vehicle,
    switching on and/or switching off a lighting function of the vehicle,
    tilting in and/or tilting out a door mirror of the vehicle,
    switching on and/or switching off an alarm system of the vehicle,
    adjustment of a user-specific setting in the vehicle, in particular the seating position of the vehicle seat
    retracting and/or extending a trailer coupling.

The requirements on the detection of a user in step b) and/or d), that is to say the detection period, the size of the object, the movement of the object, the approach of the object, etc., can be combined as desired. For example, it might be the case that the object has to have a specified size and to approach the optical sensor, in order to be detected as a user and trigger a signal for the start of an authentication check.

The method according to the invention can comprise a sensor system with a light module, which emits light so that a transmission area is produced, wherein the sensor has a reception area which at least partially overlaps the transmission area, wherein the region of overlap is the detection area. This means that the detection area can be formed by the superposition of a transmission area of the light module and a reception area of the optical sensor. The transmission area of the light module is given by the area from which the light module emits light of sufficient intensity. The reception area is given by the area from which the optical sensor can receive light. The transmission area of the light module can be composed from the transmission ranges of the individual light sources. Alternatively, the transmission area can be restricted to the superposition of the transmission areas of the individual light sources.

Preferably, the ID transmitter sends an authentication code to the access control system of the vehicle during step b), wherein the access control system compares the authentication code with a stored code, and an unlocking signal is triggered in the event of a match. Step d) advantageously takes place only in the event of a defined motion of a part of the body of the user in/on the actuation area, wherein the body part is a foot or a hand of the user.

In a possible embodiment of the invention, the actuation area is located on the ground on which the user has to place his foot for step d), wherein in particular the user only has to place his foot for a definite period of time, in order to trigger an operating signal in accordance with step d). This can mean that the user has to place his foot on the area of ground defined by the actuation area. According to the invention the method can be designed in such a way that the user has to place his foot in the actuation area within a defined time window. If the user does not do this, step d) cannot be triggered.

It is alternatively conceivable that the actuation area is located at a distance from the ground and from the sensor system, wherein in particular, the actuation area comprises a hologram. According to the invention, the actuation area can be located, for example, at the same height as the sensor system, for example a short distance away from the motor vehicle. The user only needs to move into this actuation area with a body part in order to trigger the operating signal for the motor vehicle.

Figure 4:
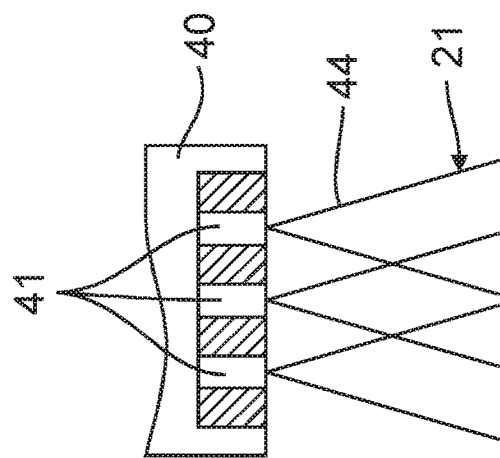
Figure 3:
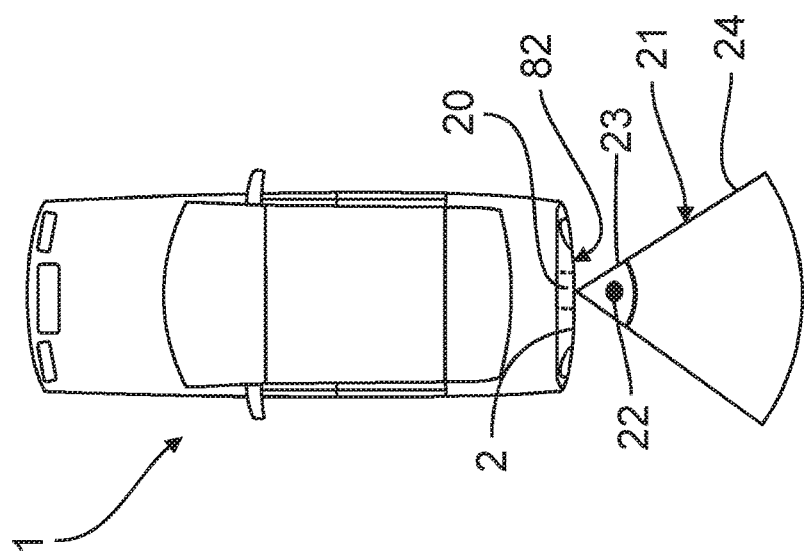
Figure 2:
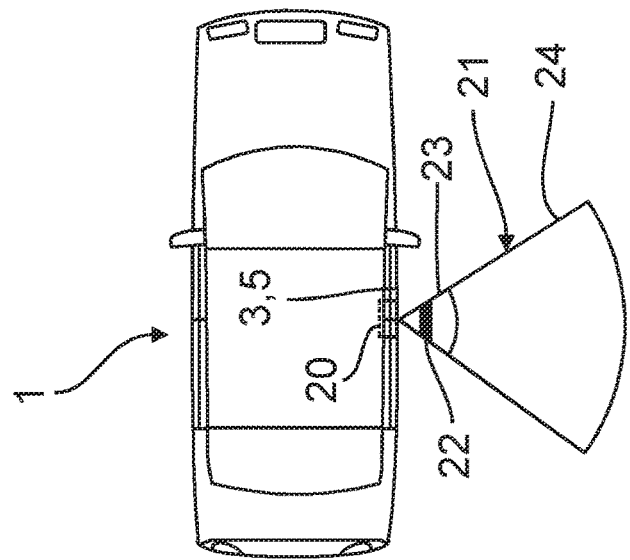
Figure 6:
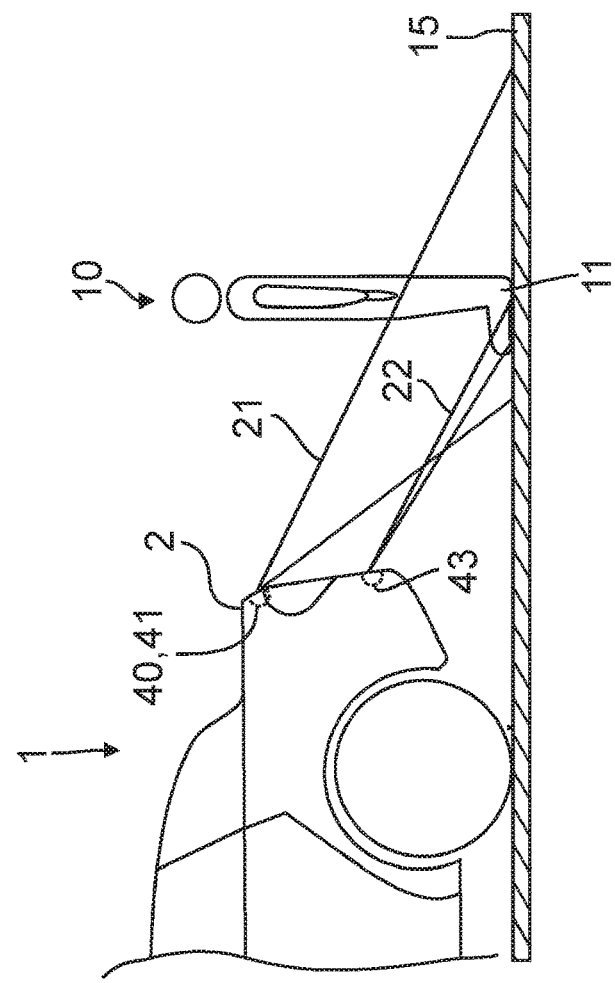
Figure 5:
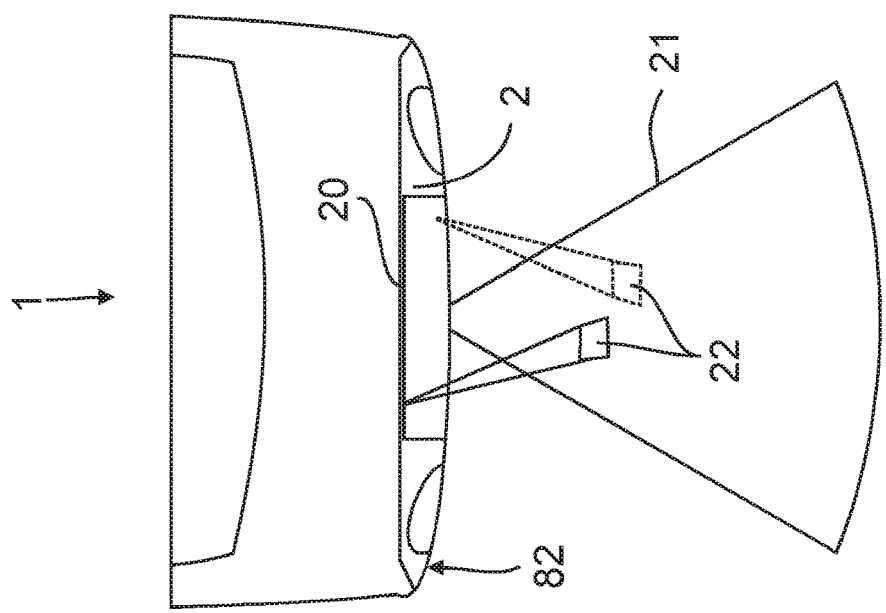
Figure 13:
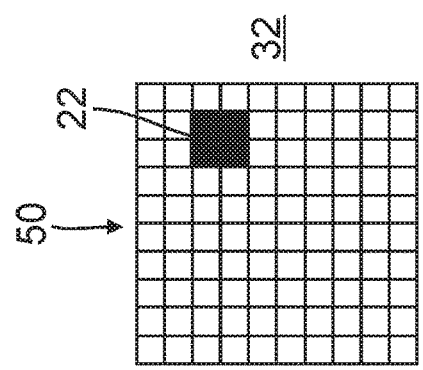
Figure 12:
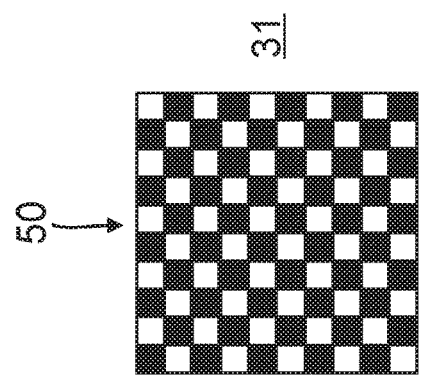
Figure 11:
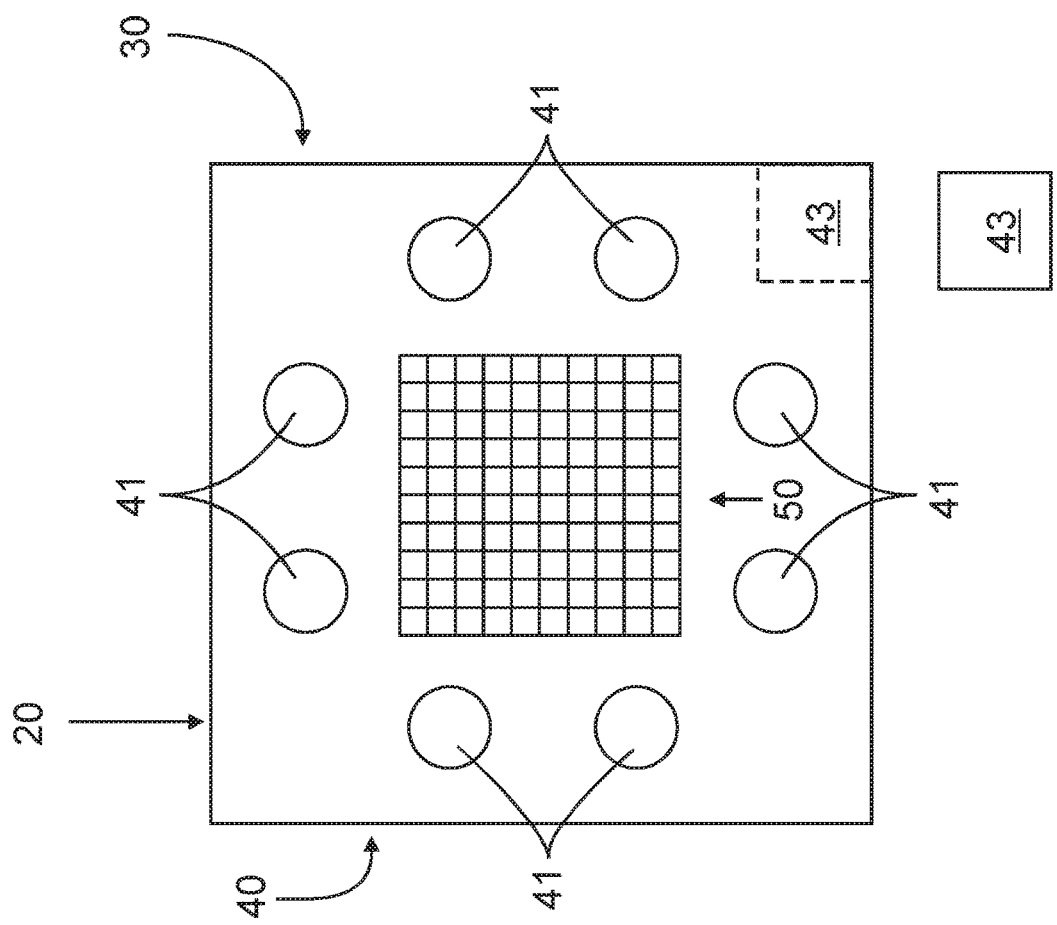
Figure 14:
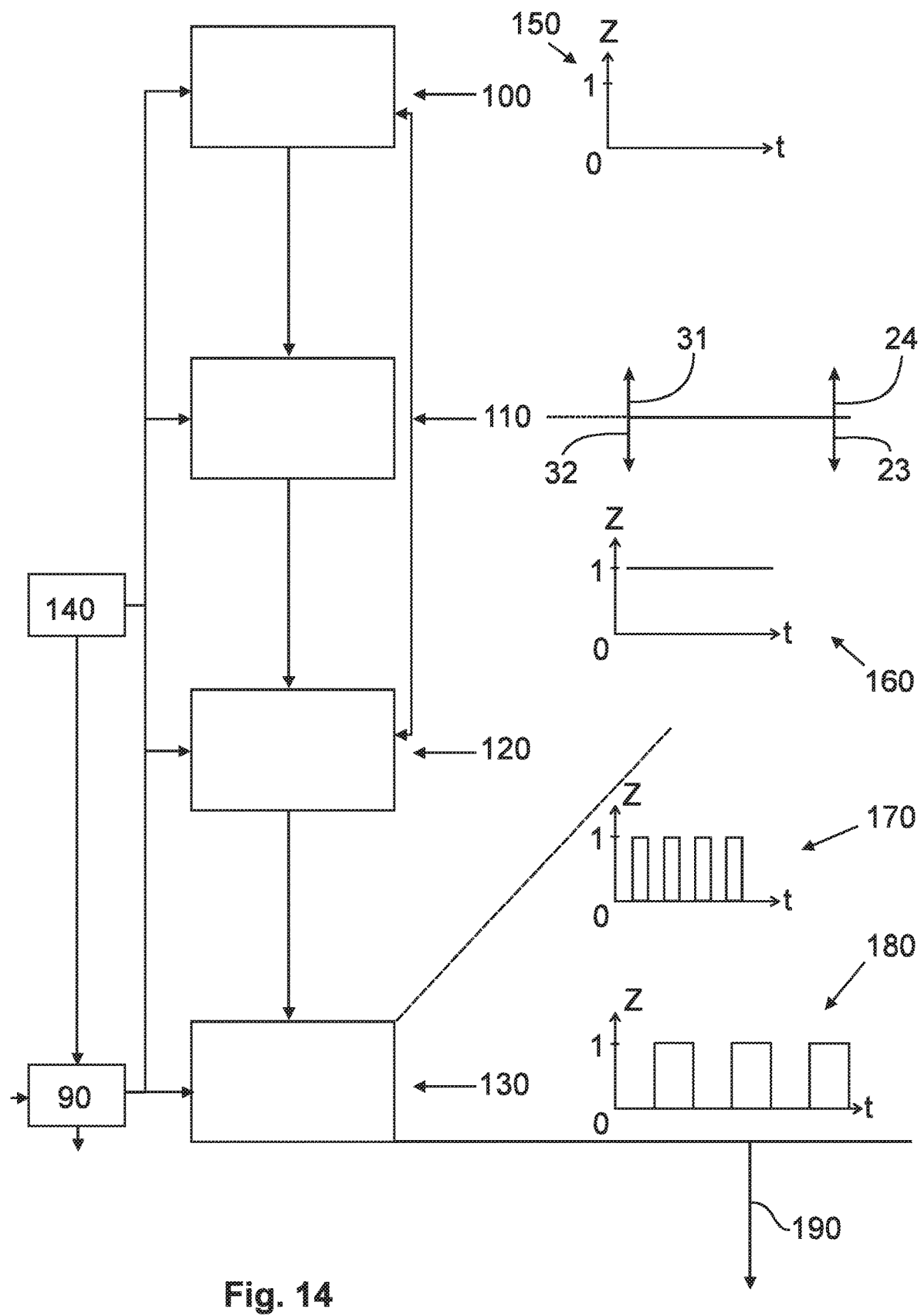

Further measures which improve the invention are derived from the following description of the exemplary embodiments of the invention, which are shown schematically in the figures. All of the specified features or advantages from the claims, the description or the drawings, including constructional details, spatial arrangement and method steps, can be essential to the invention either in themselves or in the most diverse combinations. Shown are:

FIG. 1 a schematic view of an assembly modules for a motor vehicle with an optical sensor system, which monitors a detection area and an actuation area, FIG. 2 a schematic plan view of a motor vehicle that is equipped with an optical sensor system in accordance with FIG. 1, FIG. 3 a schematic plan view of a motor vehicle with an optical sensor system in accordance with FIG. 1, FIG. 4 a schematic view relating to a light module of an optical sensor system, FIG. 5 a plan view of a motor vehicle which comprises an assembly module with an optical sensor system, FIG. 6 a side view of the motor vehicle in accordance with FIG. 5, FIG. 7 a further view of a motor vehicle with an assembly module in accordance with FIG. 1, FIG. 8 a further example of an assembly module with an optical sensor system for monitoring a detection area and an actuation area, FIG. 9 an exemplary embodiment of a motor vehicle emblem, in which an optical sensor system is integrated for monitoring a detection area and an actuation area, FIG. 10 a diagram of the radiation intensity over time emitted by an optical sensor system for monitoring the detection area and/or the actuation area, FIG. 11 a schematic view of an optical sensor of the sensor system, FIG. 12 a view of the optical sensor in accordance with FIG. 11, operated in an evaluation mode, FIG. 13 the optical sensor in accordance with FIG. 12, operated in a second evaluation mode, FIG. 14 a flowchart of a possible method that can operate an assembly module in relation to FIGS. 1 to 13, FIG. 15 a schematic view of the sensor system, which is performing a distance change check.

FIG. 1 shows an assembly module 20 which can be applied to a motor vehicle 1. The assembly module 20 has an optical sensor system 30, which is suitable for monitoring the near surroundings of the motor vehicle 1. The assembly module 20 is electronically connected to a set of motor vehicle electronics which is integrated in the motor vehicle 1, wherein an operating signal for the motor vehicle 1 can be generated by detection of a user 10, in order, for example, to trigger unlocking and/or locking and/or opening and/or closing of a moving part 2, 3 of the motor vehicle of the motor vehicle 1. The movable part 2, 3 can be, for example, a tailgate 2, or a side door 3 or sliding door 3.

The optical sensor system 30 has an optical sensor 50 and a light module 40, wherein the light module 40 can emit light 44, resulting in a detection area 21. The mounting module 20 also includes a display element 43, which can cause an actuation area 22 to be created. In addition, the light module 40 comprises a plurality of light sources 41, which is shown schematically in FIG. 4 and FIG. 11. The light module 40 is also spaced a distance from the optical sensor 50 which in the present exemplary embodiment can lie in a range d with a value of 1 cm≤d≤3 cm. The optical sensor 50 is designed in such a way that light 44 is received from the detection area 21 and/or from the actuation area 22. In the exemplary embodiments shown the detection area 21 is not visible to the user 10, wherein the light module 40 is designed such that the emitted light 44 is IR radiation.

The light module 40 in accordance with FIG. 1 can comprise a lens system 42 that can, for example, be additionally designed with a filter which is not explicitly shown. FIG. 1 also shows a control unit 60, which is suitable for evaluating the data from the sensor 50. In addition, the control unit 60 can perform additional functions, which will be described hereafter. Advantageously the control unit 60 is integrated within the assembly module 20. It can also be conceivable that the control unit 60 is arranged on the motor vehicle, wherein an electronic connection exists between control unit and the assembly module 20 or optical sensor system 30.

The assembly module 20 in accordance with all exemplary embodiments is arranged in a holder 25 which is designed for mounting the assembly module 20 on the motor vehicle 1. The installation module 20 and/or the holder 25 in accordance with all exemplary embodiments are suitable for being arranged on the motor vehicle rear (FIG. 3, FIG. 5, FIG. 6 and FIG. 8), or on a side of the vehicle (FIG. 2 and FIG. 7). For example, the assembly module 20 can be attached to the B-Pillar 4 of the motor vehicle 1 (see FIG. 7). The invention also comprises the fact that the assembly module 20 according to the invention is at least partially integrated in the door handle 5, as shown schematically in FIG. 7.

FIG. 1 shows that the assembly module 20 is provided on a handle strip 8 of the motor vehicle 1, wherein the handle strip can be, for example, part of a door handle or a boot handle. The optical sensor 50 can also be equipped with a lens system 51, which is shown in FIG. 1. FIG. 8 and FIG. 9 show the exemplary embodiment in which the assembly module 20 is provided in an emblem 80 of the vehicle 1. The light module 40 and the display element 43 are aligned in such a way that the actuation area 22 is substantially smaller than the detection area 21.

In FIG. 8 and FIG. 9 the optical sensor system 30 also has a lighting element 45 in order to make different illumination states visible to the user 10, examples of which are shown in FIG. 14. The lighting element 45 can also operate as a display item 43, a point which is dealt with hereafter. According to FIG. 9, the emblem 80 has different fields 81, wherein in each field 81 one of the following components is arranged: light module 40, display Element 43, optical sensor 50. It can also be provided that the lighting element 45 can be integrated in one of the fields 81. It is also conceivable within the scope of the invention that the emblem 80 is movably arranged on the motor vehicle 1. In a first position the optical sensor system 30 could e.g. be protected by being positioned behind the emblem 80. In a second position it is conceivable that the detection area 21 and/or the actuation area 22 could be monitored.

According to FIG. 1 it is conceivable that the display element 43 is located on the motor vehicle and not in the assembly module 20. The display element 43 is electrically connected to the control unit 60. Furthermore, in accordance with FIG. 1 it is conceivable to provide an emergency control 90 within the assembly module 20, wherein an operating signal can be provided for the vehicle 1 via an activation of the emergency control 90 with a part of the body 12 of the user 10. This emergency control 90 enables the user 10 to trigger said operating signal for the motor vehicle 1, if the optical sensor system 30 is somehow contaminated with dirt, or its operation is somehow impaired. In such a case the emergency control 90 can be activated by the user 10 to trigger the operating signal for the vehicle 1. The emergency control 90 has an activation means 91, which can be, e.g., a button or a switch, wherein the activation means 91 can function in a capacitive, inductive or contactless manner. The activation means can also be a piezoelement. If the sensor system 30 is considerably contaminated with dirt so that the optical sensor system 30 is not able to adequately monitor the detection area 21 and/or the actuation area 22, the sensor system 30 is capable of being operated with increased power, making a satisfactory monitoring of the detection area 21 and/or the actuation area 22 possible.

The optical sensor system 30 can monitor the area outside of the motor vehicle 1 in accordance with FIG. 1, in particular monitor a detection area 21, wherein the detection area is divided up into a near zone 23 and a far zone 24. The near zone 23 is a smaller distance away from the sensor system 30 than the far zone 24. The sensor system 30 according to the invention continuously monitors the detection area 21, and even when the user 10 is located outside the detection area 21. The monitoring of the detection area 21 is also shown schematically in FIG. 14 with the reference numeral 100. If the user 10 now moves inside the detection area 21 into the near zone 23, a signal for the start of an authentication check is sent between an ID transmitter 13, which the user carries on his person, and the motor vehicle 1, which is shown schematically in FIG. 14 with the reference numeral 110. If a positive authentication occurs, which means that the user 10 is entitled with his ID transmitter 13 to provide an operating signal for the motor vehicle 1, then the method step 120 in accordance with FIG. 14 takes place, in which an actuation area 22 outside of the motor vehicle 1 which differs from the detection area 21 is monitored. In accordance with all exemplary embodiments the sensor system 30 emits light in the range invisible to the user, which creates the detection area 21. Advantageously, the sensor system 30, in particular the light module 40, emits pulsed light. The user 10 can now activate the actuation area 22 using a defined movement, gesture, etc., which is detected by the sensor system 30. If the user 10 is detected in the actuation area 22, the operating signal is provided for the motor vehicle 1, which is shown in the method step 130 according to FIG. 14.

The assembly module 20 can be in data communication with an access control system 14 of the vehicle 1, wherein, for example, a door lock 8 can be appropriately addressed using the operating signal so that it can unlock and/or lock in order, for example, to be able to open or close a tailgate or a door of the vehicle 1. The defined gesture of the user 10 in the operating area 22 can be different, for example, it can be provided that the user 10 steps with his foot 11 onto the visible actuation area 22 (see FIG. 6). In FIG. 5 a further variant is shown in which two actuation areas 22 are displayed, which the user 10 has to activate in order to activate the method step with the reference numeral 130 according to FIG. 14. It is particularly advantageous that the detection area 21 is continuously monitored, in particular even when the user is outside the detection area 21, according to FIG. 1. According to FIG. 1 the actuation area 22 is inside the detection area 21, wherein while the actuation area 22 is monitored the light module 40 continues to emit invisible light, causing the detection area 21 to be formed and the optical sensor 50 monitors the actuation area 22 at the same time. This means that the sensor 50 receives light from the detection area 21 and light from the actuation area 22. These data and/or signals are captured by the image sensor 50, wherein the control unit 80 performs the evaluation of the data. The control unit can also be integrated into image sensor 80, in particular into the optical sensor 50.

FIG. 4 shows that the sensor system 30 in accordance with all exemplary embodiments can emit a plurality of light beams 44, which when combined together form the detection area 21. Thus, the light module 40 comprises a plurality of light sources 41, each of which emits individual light beams 44 into the external area of the motor vehicle 1 to create the detection area 21. An advantage of this is that the light intensity of the individual light sources 41 can be significantly reduced, which means the energy consumption of the optical sensor system 30 can be reduced.

FIG. 15 shows a schematic diagram of the sensor system 30, which in FIG. 1 and also in the remaining exemplary embodiments can perform a check for a change in distance, in order to detect a user 10 in the detection area 21 and/or in the actuation area 22, who is approaching the vehicle 1. The light module 40 sends non-visible light in the direction of the actuating area 22, which takes a time $t_1$ to exit the light module 40 and to be received by the optical sensor 50. If a user 10 then approaches the actuation area 22, which is shown in FIG. 15b, the light 44 takes the time $t_2$ to travel from the light beam 40 to the optical sensor 50. Thus the method according to the invention obtains the valuable information that a user 10 is approaching the vehicle 1. Advantageously, a distance check is not performed until the user 10 is in the near zone 23. This enables the energy consumption of the assembly module during operation to be kept low. In accordance with all exemplary embodiments the sensor system 30 can receive images of the detection area 21 and the actuation area 22. The images are advantageously pulsed images and unpulsed images, wherein the pulsed images arise due to reflection of a pulsed light 44 emitted by the sensor system 30 and the unpulsed images arise due to the light from the detection area 21 and the actuation area 22. By using pulsed light, extraneous light from the environment can be effectively cancelled out, so that it is possible to carry out reliable monitoring of the detection area 21 and the actuation area 22.

In monitoring both the detection area 21 and the actuation area 22, the pulsed images are compared with the unpulsed images, wherein the said distance change check is carried out in which the pulsed images are compared with the unpulsed images. So that the mounting module 20 according to the invention consumes as little energy as possible, the sensor system 30 is switchable between a sleep mode 31 and an operating mode 32, which is shown in FIG. 14. FIG. 11 shows a schematic diagram of the sensor 50 with the light sources 41 arranged adjacent thereto. The display element 43 can be integrated in the light module 40. It is also conceivable to arrange the display element 43 spaced apart from the light module 40. The sensor 50 comprises a plurality of pixels arranged in the form of a matrix. FIG. 12 shows the sleep mode 31 of the optical sensor 50, in which only half of the pixels are evaluated. FIG. 9 shows the operating mode 32 in which only 4 pixels corresponding to the actuation area 22 are monitored and evaluated. The other pixels are those which are not evaluated. The pixels shown in white in FIG. 8 and FIG. 9 are not taken into account in the evaluation, so that energy can be saved during the operation of the assembly module 20.

FIG. 10 contains a plot of a light intensity I over time ts. As shown, after each time period t an image 61 is captured by means of the sensor 50, wherein each time period shown in FIG. 10 is the time required for one image 61. This can be either a detection image 64 or a recognition image 63. The detection image 64 has been captured by means of light pulses 62 of the light module 40. This requires a plurality of light pulses 62 in order to generate an image 61. The light pulses 62 are emitted by the light module 40 with a specified pulse frequency. The pulse frequency during the sleep mode 31 can be lower than that of the operating mode 32. The image frequency which is derived from the time period t can also be lower in a sleep mode 31 than in an operating mode 32. The light of the light pulses 62 received by the sensor 50 of an image 61 is integrated or summed in order to generate the image 61. In order to carry out a distance measurement, the optical sensor system 30 defines a time interval tz in which the light pulses 62 generate an image 61. The distance from the user 10 to the optical sensor 50 is determined based on the intensity of the light pulses 62 in the time interval tz. In the recognition image 63 an image 61 is captured without light pulses 62 of the light module 40 reaching the image sensor 50. To do so, the light module 40 emits no light. The pulsing of the light in accordance with FIG. 10 is applicable for example in FIG. 1 as well as in all exemplary embodiments, in particular in order to cancel out extraneous light sources.

In all the exemplary embodiments the actuation area 22 can be located on the ground 15. It is also conceivable that the actuation area 21 is located at a distance from the ground 15 and at the same level as the sensor system 30, in particular at the level of the emblem 80. The actuation area 22 should only be visible to the user 10 in order to address this actuation area 22 via a corresponding action or gesture. For example, the actuation area 22 can be configured in such a way that a hologram is generated for the user 10, which is e.g. free-floating in front of the optical sensor system 30 at a distance from the motor vehicle 1 and the ground 15, and can be activated by the user. The invention naturally also includes the fact that additional signals can be triggered on the motor vehicle, such as the movement of a window if the user 10 performs the corresponding action in the method step 130 according to FIG. 14.

According to FIG. 8 and FIG. 9 the optical sensor system 30 comprises a lighting element 45 that can be switched into different illumination conditions, as shown schematically in FIG. 14. During the monitoring of the detection area 21 in the method step 100, the lighting element 45 is deactivated and therefore emits no light, which is shown with the reference numeral 150. If the authentication check in the method step 110 is positive, the lighting element 45 enters a first illumination state which bears the reference numeral 160 in FIG. 14. In the present exemplary embodiment a continuous light is generated on the lighting element 45, which can be detected by the user 10. The method step 120 then takes place, in which the actuation area 22 is monitored by the sensor system 30. The first illumination state 180 informs the user 10 to move his hand in the proximity of the emblem 80, in particular to activate the actuation area 22 which is located near to the emblem 80. Once the user 10 has done this, the lighting element 45 changes into the second illumination state 170, represented by a flashing signal. This allows the user 10 to receive the information to remove his hand from the actuation area 22. The lighting element 45 then changes into a third illumination state 180, which is also a flashing signal, wherein the individual light signals are active for longer than the shorter light signals of the illumination state 170.

The detection of contamination by dirt or of a defect can be performed in method step 140, wherein the control unit 60 for example obtains the information from method step 140. E.g., it is conceivable that in accordance with method step 140, the emergency control 90 is activated or switched to an operationally ready state, so that a manual operation of the emergency control 90 by the user 10 can trigger an operating signal for the vehicle 1 in accordance with method step 130.

The assembly module 20 in accordance with FIG. 1 can be inserted both in the rear area 82 as shown in FIG. 5, FIG. 6 and FIG. 8, and in the side area of the motor vehicle as shown in FIG. 7. In this case the method steps in accordance with FIG. 14 are applicable to all exemplary embodiments in accordance with FIGS. 1 to 9 and FIG. 15. FIG. 9 can also include the assembly module 20 and/or the method steps in accordance with FIG. 14. FIG. 8 can also be extended in such a way that the lighting element 45 operates as a display element 43 as shown in FIG. 1. It is also conceivable that the number plate 7 (FIG. 8) can additionally be illuminated using the display element 43 and/or the lighting element 45. In the schematic views of FIG. 2 and FIG. 3 it is very clear that in fact a very large detection area 21 can be monitored via the optical sensor system 30 according to the invention. But since the near zone 23 and the actuation area 22 are very small compared to the detection area 21, the optical sensor system 30 can be operated in an energy-saving manner. A significant contribution to the energy savings is supplied by the idea that the optical sensor system 30 can be switched between a sleep mode 31 and an operating mode 32 and an authentication check in accordance with step 110 can only be carried out when the user 10 is in the near zone 23.

REFERENCE LIST 1 motor vehicle
2 tailgate (moving part)
3 side door, sliding door (moving part)
4 B-pillar
5 door Handle
6 handle strip
7 number plate
8 door lock
10 user
11 foot
12 hand
13 ID transmitter
14 access control system
15 ground
20 assembly module
21 detection area
22 actuation area
23 near zone
24 far zone
25 holder
30 optical sensor system
31 sleep mode
32 operating mode
40 light module
41 light source
42 lens system
43 display element
44 light, light beam, light cone
45 lighting element
50 optical sensor
51 lens system
60 control unit
61 image, pulsed
62 light pulse 63 recognition image
64 detection image
80 emblem
81 fields
82 motor vehicle rear
90 emergency control
91 activation means, button, switch
100 method step
110 method step
120 method step
130 method step
140 method step
150 illumination state
160 illumination state
170 illumination state
180 illumination state

The invention claimed is:

1. A method for operating an assembly module for a motor vehicle, the method comprising:
   a) monitoring a detection area which lies outside the vehicle,
   b) triggering a signal for the start of an authentication check between an ID transmitter and the motor vehicle if a user is detected in the detection area based on the monitoring of the detection area,
   c) monitoring an actuation area which is outside the vehicle and differs from the detection area, and
   d) providing an operating signal for the vehicle if a user is detected in the actuation area based on the monitoring of the actuation area,
   wherein the assembly module comprises an optical sensor system comprising an optical sensor, and the optical sensor system is configured for performing said method,
   wherein the sensor system at least receives or captures images of at least the detection area or of the actuation area, wherein the images are pulsed images and unpulsed images, wherein the pulsed images arise due to the reflection of a pulsed light emitted from the sensor system and the unpulsed images arise due to the light of at least the detection area or actuation area, wherein the pulse frequency of the emitted light in a sleep mode is less than in an operating mode.

2. The method according to claim 1, wherein the assembly module is arranged in a holder that is designed for mounting the assembly module on the motor vehicle, wherein the assembly module or the holder is suitable for attaching to the rear of the vehicle or to a side of the vehicle.

3. The method according to claim 1, wherein the optical sensor system comprises a lateral drift-field photo detector (LDPD) sensor.

4. The method according to claim 1, wherein the optical sensor system is designed in such a way that the detection area is at least partially located above an area of ground, on which the motor vehicle is standing.

5. The method according to claim 1, wherein the operating signal is a signal for at least unlocking, locking, opening or closing a moveable part of the motor vehicle, wherein the movable part is a tailgate or a side door or a sliding door.

6. The method according to claim 1, herein the detection area is continuously monitored.

7. The method according to claim 1, wherein
   the detection area is divided up into at least two zones, into a near zone and a far zone, wherein the near zone has a smaller distance from the sensor system than the far zone, wherein a detection of the user in accordance with step b) only takes place if the user is located in the near zone.

8. The method according to claim 1, wherein the actuation area is within the detection area.

9. The method according to claim 1, wherein
   the sensor system emits a plurality of light beams, which when combined together form the detection area.

10. The method according to claim 9, wherein the light beams are light cones.

11. The method according to claim 1, wherein
   the sensor system carries out a distance change check in order to detect a user who is approaching the vehicle at least in the detection area or in the actuation area, wherein the sensor system only carries out a distance change check if the user is located in the near zone.

12. The method according to claim 1, wherein
   the sensor system is switchable between a sleep mode and an operating mode, wherein the sensor system is set in the sleep mode until the user enters the near zone.

13. The method according to claim 1, wherein
   the monitoring of the detection area is carried out in such a way that the pulsed images are compared with the unpulsed images, wherein a distance change check is carried out in which the pulsed images are compared with the unpulsed images.

14. The method according to claim 1, wherein
   during step b) the ID transmitter sends an authentication code to the access control system of the motor vehicle and the access control system compares the authentication code with a stored code and in the event of a match an unlocking signal is triggered.

15. The method according to claim 1, wherein
   step d) takes place only in the event of a defined movement of a part of the body of the user in/on the actuation area, wherein the body part is a foot or a hand of the user.

16. The method according to claim 1, wherein
   the actuation area is located on the ground on which the user has to place his foot for step d), wherein the user only has to place his foot for a defined period of time, in order to trigger an operating signal in accordance with step d).

17. The method according to claim 1, wherein
   the actuation area is located a distance away from the ground and from the sensor system, wherein the actuation area comprises a hologram.

18. The method according to claim 1, wherein
   the optical sensor system comprises a light module which emits light so that a transmission area is produced, wherein the sensor system has a reception area which overlaps at least a portion of the transmission area, the region of overlap being the detection area.

19. The module method according to claim 18, wherein the light module comprises a plurality of light sources, and/or that the light module is designed in such a way that the emittable light consists of IR radiation.

20. The method according to claim 18, wherein the light module or the optical sensor comprise comprises a lens system, wherein the lens system comprises a filter.

21. The method according to claim 18, at least wherein the light module is spaced a distance d from the optical sensor, wherein the distance has a value of 1 cm d 3 cm, or wherein the sensor system is configured such that the light from the light module is emitted at a distance of up to 2 m from the vehicle.

22. The assembly module according to claim 21, wherein the distance has a value of 2 cm.

23. The method according to claim 1, wherein the assembly module is integrated into a handle strip of the vehicle, or wherein the holder is arranged on an emblem of the vehicle.

* * * * *